Jan. 21, 1941.  G. H. YOUNG  2,229,431
ANODE
Filed April 10, 1937
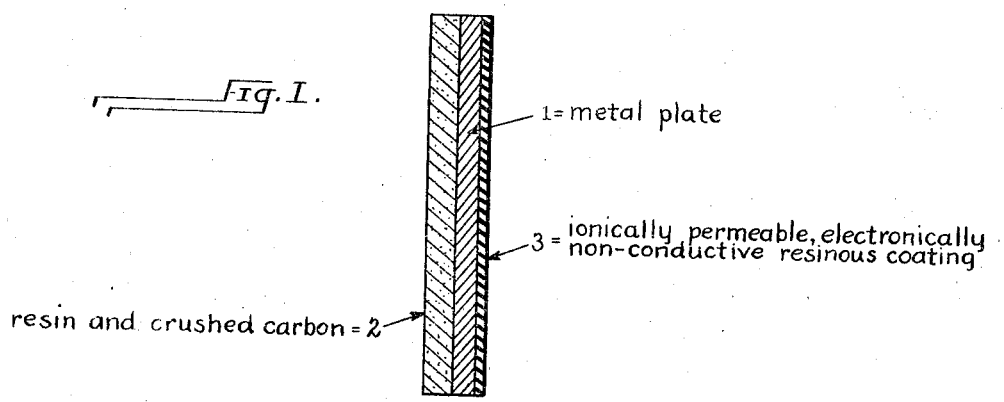
Fig. I.
1 = metal plate
3 = ionically permeable, electronically non-conductive resinous coating
resin and crushed carbon = 2
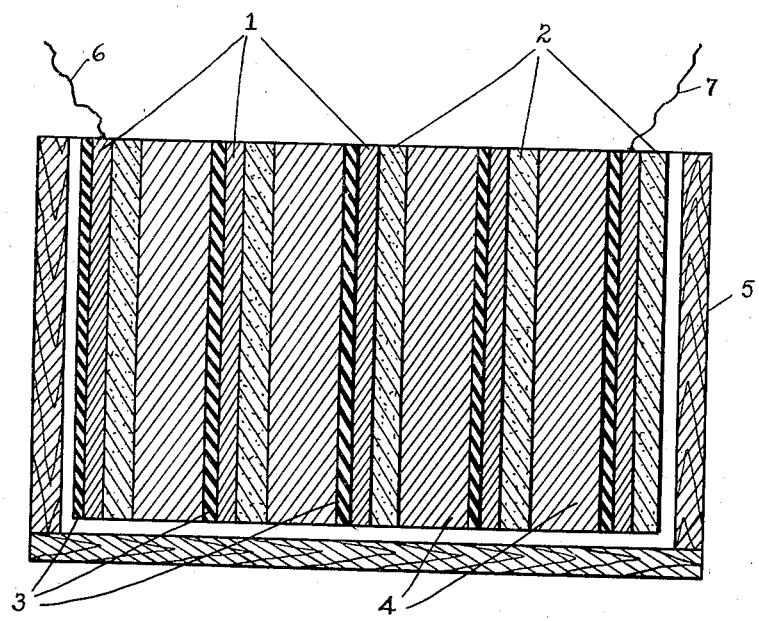
Fig. II.
INVENTOR
George H. Young
by Christy and Wharton
attorneys Patented Jan. 21, 1941

REISSUED
APR 7- 1942

2,229,431

UNITED STATES PATENT OFFICE 2,229,431

ANODE

George H. Young, Pittsburgh, Pa., assignor to Stoner-Mudge, Inc., a corporation of Pennsylvania Application April 10, 1937, Serial No. 136,175

11 Claims. (Cl. 136—111)

This invention relates to the structure of anodes, and finds particular application in the construction of dry cells. The advantages gained by the invention are simplification in manufacture of a dry cell, diminution of space in the manufactured article, increase in shelf-life for the cell, and increase of amperage output.

In the accompanying drawing Fig. I is a view in section of an electrode of the invention, and Fig. II is a view of the assembly of a plurality of such electrodes with intercalated cakes of electrolyte within a container, to form a battery of dry cells.

In the production, for example, of such a dry cell as those commonly used as B batteries in radio installations, a plate of zinc is covered upon one side with a resinous coating in which coarse particles of carbon (ordinarily coke dust) are carried. The resinous coating may, for example, be such a mixture of rosin and linseed oil as (modified to achieve other ends) is specified in Letters Patent of the United States 1,508,987, or its equivalent. Upon this coating is laid a pressed cake that has been molded from a paste made up of ammonium chloride, zinc chloride, a depolarizer (typically manganese dioxide), powdered carbon, and water, or the known equivalent of such make-up. Such a paste is typically described in United States Letters Patent No. 1,508,987, Rider and Huntley. Upon the pressed cake is laid a web of paper (resembling blotting-paper); and upon the web of paper is laid a second plate of zinc—and so the building-up of the components of a battery of dry cells proceeds.

The invention consists in such a preparation of that surface of the zinc plate which faces the pressed cake of ammonium and zinc chlorides as shall render the web of paper superfluous and effect its elimination. The surface of the zinc plate is prepared by coating it with a film of synthetic resin so thin that, while affording the separation that is essential to cell operation, is permeable through a multitude of minute pinholes.

Referring to the drawing, the zinc plate is indicated at 1, the resinous coating that carries particles of carbon at 2, the ionically permeable though electronically non-conductive coating of resin at 3. In Fig. II a plurality of such electrodes are assembled, with cakes 4 of the preparation of the electrolyte material specified intercalated between them. The assembly is snugly set in a suitable case 5, and electrical connections with the terminal electrodes of the assembly are diagrammatically indicated at 6, 7.

Any synthetic resin which is substantially non-hygroscopic and accordingly resistant to degradation by the electrolyte will serve. It may be applied when brought by heating to fluid condition, or it may be applied in solution. It may be applied by brushing, spraying, or rolling on. A certain minimum quantity per unit of area must be applied, to the end that the film shall be of sufficient mechanical strength and thickness; a certain maximum quantity per unit of area may not be exceeded, to the end that the film shall be porous. The condition of porosity has this effect—that, while particles of solid zinc do not pass through, the zinc ions pass freely.

The following examples are given of synthetic resin preparations suitable for use in the practice of the invention:

I

Copolymer of vinyl chloride (85%) and vinyl acetate (15%)—together, 20%

A vehicle consisting of hexone (40%); methyl ethyl ketone (10%); and toluene (50%). This vehicle is employed in quantity, 80%.

II

Polyvinyl chloride, 5%
Mesityl oxide, 95%

III

Oil-modified alkyd resin, 50%
Solvent naphtha, 50%

The oil-modified alkyd resin of this formula may be defined as covering the condensation products of polycarboxylic acids, polyhydric alcohols and monocarboxylic acids containing more than six carbon atoms (which may be used also in the form of their esters). These condensation products may, for example, be prepared from aliphatic, cycloaliphatic, or aromatic polycarboxylic acids, such as phthalic, isophthalic, terephthalic, tetrahydrophthalic, maleic, and succinic acid, condensation products of maleic acid with terpinene and like acids as the first component, from glycol, glycerine, and polyhydric alcohols derived from sugars such as mannitol as polyalcoholic component, and from aliphatic, cycloaliphatic, or aromatic monocarboxylic acids containing more than six carbon atoms, such as linoleic acid, ricinoleic acid, ricinenic acid (the acid obtainable by splitting off water from ricinoleic acid), coconut fatty acid, soya-bean oil fatty acid, linseed-oil fatty acid, colophony or the resinic acids contained therein, wood-oil acid and the like or the esters of the said acids, as the third component.

IV

Polystyrene, 10%

A vehicle consisting of xylene (20%) and toluene (80%), the vehicle being used in the quantity, 90%

The polystyrene of this formula may be defined as covering the resinous products that result from the polymerization of styrene, whether conducted with or without catalysts, with or without the aid of actinic light, and whether at ordinary or at an elevated temperature.

V

Polymer of acrylic ester, 30%

A vehicle consisting of hexone (40%) and toluene (60%), the vehicle being employed in the quantity, 70%

The acrylic ester may respond to the formulae—

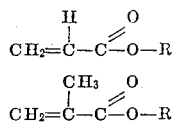

etc., where R—methyl, ethyl, isopropyl, or (in general) any aliphatic radical.

VI

Polymer of phenol-formaldehyde, 30%
Toluol, 70%

The polymer of phenol and formaldehyde may be defined as representative of a group of resinous compounds resulting from the polymerization of phenol or cresols with aliphatic aldehydes such as formaldehyde, cycloaliphatic aldehydes such as furfural, or with aromatic aldehydes such as benzaldehyde, with or without the influence of heat, pressure, or catalysts such as inorganic or organic acids or bases.

The figure for the maximum weight of the coating will vary, both with the metal to be coated (and presently mention will be made of metals other than zinc) and with the specific coating material employed. In applying a coating of any of the formulae I, II, IV and V above, the weight should be of the order of 5 milligrams or less to the square inch of surface to be coated. In the coating of Formula III the weight should be of the order of 3 milligrams to the square inch. In the coating of Formula VI the weight should be of the order of 3–4 milligrams to the square inch. The minimum in each case will be found to be, approximately, 1 milligram to the square inch. The coatings of all of the six formulae are, it will be perceived, non-hygroscopic. By virtue of their non-hygroscopic character they are inert in the assembly: they do not take up moisture from the adjacent cake of electrolyte.

Practical application will ordinarily be to the surface of a plate of zinc, but other metals are serviceable—lead, for example, cadmium, chromium, nickel, and (generally) metals and metal alloys that stand above hydrogen in the electromotive-force series. And the invention is practicable in the case of any such metal so used.

The desired condition of porosity, typically attained by mere attenuation, may in a thicker coating be attained or in a coating of the thickness specified attained in larger measure by other particular details of procedure. For instance, in the material prepared for application to the metal surface a high percentage of very low boiling-point solvent may be included. On rapid evaporation after spreading, a porous condition of the film is brought about or enhanced.

Again, porosity may be induced or enhanced by a deliberate solvent unbalance. If, for example, to an otherwise adequate vehicle for coating material a slight excess of diluent be added, then on evaporation (whether by air-drying or baking) an incipient precipitation of the resinous constituent of the coating preparation will take place, with the result that the film produced (even though the weight per square inch be such that ordinarily the film would be continuous) will be found to be porous.

Or again, the wet film (after spreading and before evaporation) may be exposed to a current of steam. This will bring about a "solvent unbalance" with like result as in the cases presented above.

I claim as my invention:

1. An electrode for a dry cell consisting of a zinc plate bearing on one side a resinous coating with particles of carbon embedded in the coating, and on the opposite side a porous ionically permeable and electronically non-conductive coating of resinous material.

2. A battery of dry cells including a plurality of electrode plates, each plate formed of metal, coated on one side with a resinous coating in which particles of carbon are carried and on the opposite side with an ionically permeable, electronically non-conductive, resinous coating, the plates being assembled with cakes of electrolyte intercalated between them.

3. A dry cell including in its structure an electrode consisting of a plate of metal coated over its electrolyte-engaging surface with an ionically permeable electronically non-conductive resinous coating substantially non-hygroscopic in character and assembled in the cell with a cake of electrolyte engaging the so-coated surface.

4. The structure of claim 3, the resinous coating upon the plate of metal being of material selected from a group that consists of co-polymers of vinyl chloride and vinyl acetate, polyvinyl chloride, the polystyrenes, oil-modified alkyd resins, phenol-aldehyde resins, and polymers of acrylic esters, the weight of the coating being of a maximum value of the order of five milligrams to the square inch of surface coated.

5. A battery of dry cells including a plurality of electrode plates, each plate formed of zinc, coated on one side with a resinous coating in which particles of carbon are carried and on the opposite side with an ionically permeable, electronically non-conductive, resinous coating, the plates being assembled with cakes of a preparation of ammonium chloride and zinc chloride intercalated between them.

6. A dry cell including an electrode and a cake of electrolyte, the electrode consisting of the plate of metal coated over its electrolyte-engaging surface with an attenuated film of synthetic resin substantially non-hygroscopic in character and inert against electrolyte attack, the degree of attenuation being such that the film, though consisting of an electronically non-conductive coating upon the plate of metal, is ionically permeable.

7. An electrode for a dry cell consisting of a metal plate bearing upon one side a resinous coating with particles of carbon embedded in the coating, and on the opposite side an attenuated film of synthetic resin non-hygroscopic in character, the degree of attenuation being such that the film, though constituting an electronically non-conductive coating upon the plate of metal, is ionically permeable.

8. An electrode for a dry cell consisting of a metal plate bearing upon one side a resinous coating with particles of carbon embedded in the coating, and on the opposite side an ionically permeable, electronically non-conductive coating of resinous material selected from a group that consists of the co-polymers of vinyl chloride and vinyl acetate, polyvinyl chloride, the polystyrenes, oil-modified alkyd resins, phenol-aldehyde resins, and polymers of acrylic esters, the weight of the coating being of a maximum value of the order of 5 milligrams to the square inch of surface coated.

9. In a dry cell, a zinc electrode having a surface thereof exposed to the electrolyte and a coating of a co-polymer of vinyl chloride (85%) and vinyl acetate (15%) on said surface.

10. In a dry cell, a zinc electrode having a surface thereof exposed to the electrolyte, and a coating of oil-modified alkyd resin on said surface.

11. In a dry cell, a zinc electrode having a surface thereof exposed to the electrolyte, and a coating of phenol-aldehyde resin on said surface.

GEORGE H. YOUNG.